United States Patent
Tomita et al.

(10) Patent No.: US 11,427,679 B2
(45) Date of Patent: Aug. 30, 2022

(54) POLYCARBONATE RESIN COMPOSITION

(71) Applicants: Mitsubishi Engineering-Plastics Corporation, Minato-ku (JP); MITSUBISHI GAS CHEMICAL COMPANY, INC., Chiyoda-ku (JP)

(72) Inventors: Keisuke Tomita, Hiratsuka (JP); Hidefumi Harada, Katsushika-ku (JP); Takehiko Isobe, Katsushika-ku (JP); Keisuke Shimokawa, Katsushika-ku (JP); Jungo Taguchi, Katsushika-ku (JP)

(73) Assignees: Mitsubishi Engineering-Plastics Corporation, Minato-ku (JP); MITSUBISHI GAS CHEMICAL COMPANY, INC., Chiyoda-ku (JP)

( * ) Notice: Subject to any disclaimer, the term of this patent is extended or adjusted under 35 U.S.C. 154(b) by 12 days.

(21) Appl. No.: 16/965,913

(22) PCT Filed: Feb. 25, 2019

(86) PCT No.: PCT/JP2019/007069
§ 371 (c)(1),
(2) Date: Jul. 29, 2020

(87) PCT Pub. No.: WO2019/187876
PCT Pub. Date: Oct. 3, 2019

(65) Prior Publication Data
US 2021/0087333 A1 Mar. 25, 2021

(30) Foreign Application Priority Data
Mar. 27, 2018 (JP) .............................. JP2018-060621

(51) Int. Cl.
| | | |
|---|---|---|
| C08L 69/00 | (2006.01) | |
| C08G 64/18 | (2006.01) | |
| C08G 64/16 | (2006.01) | |
| C08G 64/30 | (2006.01) | |
| C08K 5/1525 | (2006.01) | |
| C08K 5/526 | (2006.01) | |
| C08K 5/527 | (2006.01) | |
| C08K 5/1515 | (2006.01) | |

(52) U.S. Cl.
CPC ......... *C08G 64/1608* (2013.01); *C08G 64/30* (2013.01); *C08K 5/1515* (2013.01); *C08K 5/1525* (2013.01); *C08K 5/526* (2013.01); *C08K 5/527* (2013.01); *C08L 69/00* (2013.01); *C08G 64/183* (2013.01); *C08L 2205/025* (2013.01)

(58) Field of Classification Search
None
See application file for complete search history.

(56) References Cited

U.S. PATENT DOCUMENTS

| | | | | |
|---|---|---|---|---|
| 4,252,922 | A | * | 2/1981 | Adelmann ............. C08G 63/64 525/439 |
| 5,187,211 | A | | 2/1993 | Lundy et al. |
| 5,308,489 | A | * | 5/1994 | Dhein ................... B01D 71/50 210/500.28 |
| 6,941,057 | B1 | | 9/2005 | Okamoto et al. |
| 9,701,835 | B2 | | 7/2017 | Tomita et al. |
| 2008/0300378 | A1 | | 12/2008 | Suga et al. |
| 2014/0350148 | A1 | | 11/2014 | Takimoto et al. |
| 2017/0349729 | A1 | | 12/2017 | Egawa |
| 2017/0362398 | A1 | | 12/2017 | Tomita |

FOREIGN PATENT DOCUMENTS

| | | | |
|---|---|---|---|
| CA | 2083878 | * | 6/1993 |
| EP | 0 335 416 A2 | | 10/1989 |
| EP | 3 243 876 A1 | | 11/2017 |
| JP | 63-227627 A | | 9/1988 |
| JP | 64-22959 A | | 1/1989 |
| JP | 1-252630 A | | 10/1989 |
| JP | 05339359 | * | 12/1993 |
| JP | 9-227785 A | | 9/1997 |
| JP | 11-158364 A | | 6/1999 |
| JP | 2001-208917 A | | 8/2001 |
| JP | 2001-215336 A | | 8/2001 |
| JP | 2006-16497 A | | 1/2006 |
| JP | 2009-40843 A | | 2/2009 |
| JP | 5699188 B2 | | 4/2015 |
| JP | 2016-125028 A | | 7/2016 |
| JP | 2016-130298 A | | 7/2016 |
| JP | 2014-62203 A | | 4/2017 |
| JP | 2017-88841 A | | 5/2017 |
| JP | 2017-197703 A | | 11/2017 |
| WO | WO 2009/017089 A1 | | 2/2009 |
| WO | WO 2013/088796 A1 | | 6/2013 |

OTHER PUBLICATIONS

International Search Report dated May 14, 2019 in PCT/JP2019/007069 filed on Feb. 25, 2019, 2 pages.
Extended European Search Report dated Nov. 24, 2021 in European Patent Application No. 19774729.8, 4 pages.

* cited by examiner

*Primary Examiner* — David J Buttner
(74) *Attorney, Agent, or Firm* — Oblon, McClelland, Maier & Neustadt, L.L.P.

(57) ABSTRACT

A polycarbonate resin composition containing 0.1 to 10 parts by mass of a polycarbonate copolymer (B) having carbonate bonding between (B1) bisphenol A and a (B2) polyalkylene glycol and 0.005 to 0.5 parts by mass of a phosphorus-containing stabilizer (C) relative to 100 parts by mass of a polycarbonate resin (A).

7 Claims, 1 Drawing Sheet

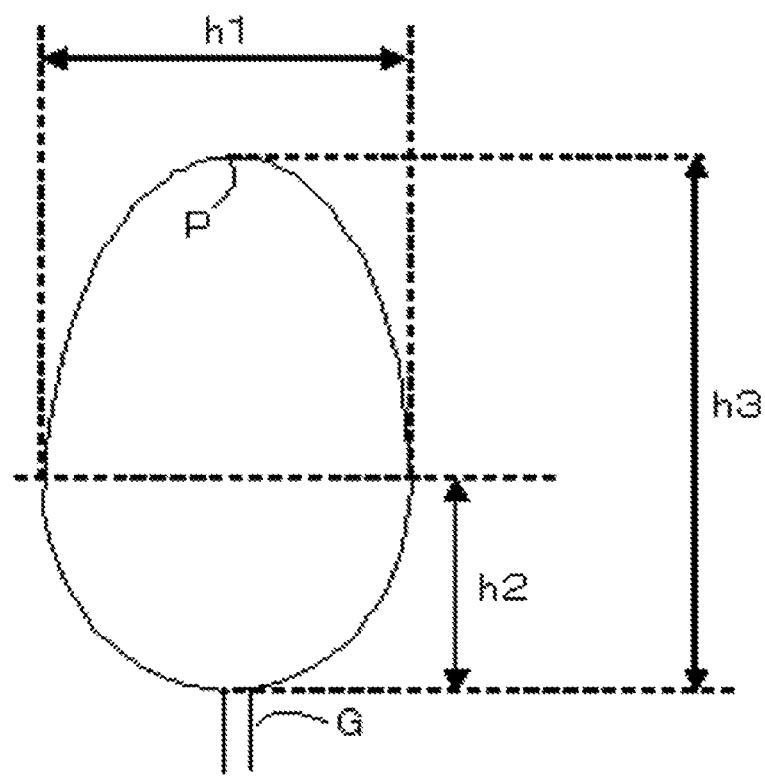

POLYCARBONATE RESIN COMPOSITION

TECHNICAL FIELD

The present invention relates to a polycarbonate resin composition, and more specifically relates to a polycarbonate resin composition which exhibits excellent impact resistance, has a good hue and causes very little gas generation and mold contamination at the time of molding; and a molded article obtained by molding the composition.

BACKGROUND ART

Liquid crystal display devices used in personal computers, mobile telephones, and the like, include planar light source devices in order to meet demands for reduced thickness and weight, reduced energy consumption and higher resolution. In addition, such planar light source devices are devices in which one surface is provided with a light guide plate having a wedge-shaped cross section having a uniform slanted surface or a panel-shaped light guide plate in order to achieve the effect of uniformly and efficiently guiding incident light to the liquid crystal display side. In addition, a light-scattering function is imparted by forming a relief pattern on a surface of the light guide plate.

This type of light guide plate can be obtained by injection molding a thermoplastic resin, and a relief pattern is imparted through transfer of a relief part formed on a surface of an insert die. In the past, light guide plates were formed from resin materials such as polymethyl methacrylate (PMMA), but in recent years, there have been demands for display devices that project more vivid images, and because temperatures inside apparatuses tend to increase as a result of heat generated in the vicinity of a light source, conventional resin materials are being replaced by polycarbonate resin materials, which exhibit higher heat resistance.

Polycarbonate resins exhibit excellent mechanical properties, thermal properties, electrical properties and weather resistance, but exhibit lower light transmittance than PMMA and the like, and problems such as low brightness therefore occur in cases where a planar light source is constituted from a polycarbonate resin light guide plate and a light source. In addition, there have been demands in recent years for a reduction in differences in chromaticity between an incident part of a light guide plate and a position distant from the incident part, but polycarbonate resins are more likely to suffer from problems such as yellowing than PMMA.

PTL 1 proposes a method for improving light transmittance and brightness by adding an acrylic resin and an alicyclic epoxy compound, PTL 2 proposes a method for improving brightness by modifying a terminal of a polycarbonate resin and increasing the transferability of a relief part to a light guide plate, and PTL 3 proposes a method for improving brightness by introducing a copolyester carbonate having an aliphatic segment so as to improve transferability.

However, the method disclosed in PTL 1 achieves an improvement in hue by adding the acrylic resin, but cannot increase light transmittance and brightness due to white turbidity occurring, and adding the alicyclic epoxy compound can improve transmittance, but no improvement in hue has been confirmed. In the case of PTL 2 and PTL 3, advantageous effects can be expected in terms of improved fluidity and transferability, but the problem of reduced heat resistance occurs.

However, blending polyethylene glycol, poly(2-methyl) ethylene glycol, or the like, in a thermoplastic resin such as a polycarbonate resin is a known feature, and PTL 4 discloses a γ-radiation-resistant polycarbonate resin containing same, and PTL 5 discloses a thermoplastic resin composition which contains PMMA or the like and which exhibits excellent anti-static properties and surface appearance.

In addition, PTL 6 proposes improving transmittance and hue by blending a polyalkylene glycol constituted from a straight chain alkyl group. An improvement in transmittance and degree of yellowing (yellow index: YI) can be seen by blending polytetramethylene ether glycol.

Furthermore, PTL 7 discloses a method for producing a polycarbonate copolymer by using a diol obtained by diesterification of a polyalkylene glycol as a raw material (comonomer), but in this polycarbonate copolymer, the diol obtained by diesterification of a polyalkylene glycol is unstable, and the polycarbonate copolymer is inadequate in terms of impact resistance and is also poor in terms of hue and thermal discoloration resistance.

In recent years in particular, optical components such as light guide plates in hand-held terminals such as smart phones and tablets have become both thinner and larger at a remarkable rate, and there have been demands for higher barrel temperatures and higher injection speeds for molding light guide plates. As a result, the amount of gas generated at the time of molding has increased and problems have occurred, such as mold contamination readily occurring. Therefore, resin compositions used for molding such products require not only excellent optical characteristics, but also low mold contamination caused by gas generation during high temperature injection molding, and excellent impact resistance.

CITATION LIST

Patent Literature

[PTL 1] JP H11-158364 A
[PTL 2] JP 2001-208917 A
[PTL 3] JP 2001-215336 A
[PTL 4] JP H01-22959 A
[PTL 5] JP H09-227785 A
[PTL 6] JP 5699188 B2
[PTL 7] JP 2006-016497 A

SUMMARY OF INVENTION

Technical Problem

In view of the circumstances mentioned above, the purpose of the present invention is to provide a polycarbonate resin composition which has a good hue, exhibits excellent impact resistance, and causes very little gas generation and mold contamination at the time of molding.

Solution to Problem

As a result of repeated diligent research carried out in order to solve the problems mentioned above, the inventors of the present invention found that by blending a conventional polycarbonate resin with specific quantities of a phosphorus-containing stabilizer and a specific polycarbonate copolymer having carbonate bonding between bisphenol A and a polyalkylene glycol, it was possible to obtain a polycarbonate resin composition which exhibits excellent impact resistance, has a good hue and causes very little gas generation and mold contamination at the time of molding, and thereby completed the present invention.

The present invention relates to the following polycarbonate resin composition and molded article.

[1] A polycarbonate resin composition containing 0.1 to 10 parts by mass of a polycarbonate copolymer (B) having carbonate bonding between (B1) bisphenol A and a (B2) polyalkylene glycol and 0.005 to 0.5 parts by mass of a phosphorus-containing stabilizer (C) relative to 100 parts by mass of a polycarbonate resin (A).

[2] The polycarbonate resin composition according to [1] above, wherein the (B2) polyalkylene glycol that constitutes the polycarbonate copolymer (B) has a number average molecular weight (Mn) of 500 to 4,000.

[3] The polycarbonate resin composition according to [1] or [2] above, wherein the polycarbonate copolymer (B) has a weight average molecular weight (Mw) of 5,000 to 40,000.

[4] The polycarbonate resin composition according to any one of [1] to [3] above, wherein a mass ratio of the (B1) bisphenol A and the (B2) polyalkylene glycol that constitute the polycarbonate copolymer (B) is such that, relative to a total of 100 mass % of components (B1) and (B2), a proportion of component (B1) is not less than 5 mass % and less than 50 mass % and a proportion of component (B2) is more than 50 mass % and not more than 95 mass %.

[5] The polycarbonate resin composition according to any one of [1] to [4] above, wherein the (B2) polyalkylene glycol that constitutes the polycarbonate copolymer (B) is a polyalkylene glycol constituted of tetramethylene ether units.

[6] The polycarbonate resin composition according to any one of [1] to [5] above, which further contains an epoxy compound (D) and/or an oxetane compound (E) at an amount of 0.0005 to 0.2 parts by mass relative to 100 parts by mass of the polycarbonate resin (A).

[7] A molded article of the polycarbonate resin composition according to any one of [1] to [6] above.

[8] The molded article according to [7] above, which is an optical component.

Advantageous Effects of Invention

The polycarbonate resin composition of the present invention exhibits excellent impact resistance, has a good hue and causes very little gas generation and mold contamination at the time of molding, and a molded article comprising the polycarbonate resin composition exhibits excellent impact resistance and is particularly suitable for use as an optical component having a good hue.

BRIEF DESCRIPTION OF DRAWINGS

FIG. 1 is a planar view of a droplet-shaped mold used to evaluate mold contamination in examples.

DESCRIPTION OF EMBODIMENTS

The present invention will now be explained in detail through the use of embodiments, examples etc.

Moreover, in the present description, the symbol "-" (or "to" between values) means that the upper and lower limits of the numerical values mentioned before and after the symbol are included, unless otherwise specified.

The polycarbonate resin composition of the present invention contains 0.1 to 10 parts by mass of a polycarbonate copolymer (B) having carbonate bonding between (B1) bisphenol A and a (B2) polyalkylene glycol and 0.005 to 0.5 parts by mass of a phosphorus-containing stabilizer (C) relative to 100 parts by mass of a polycarbonate resin (A).

Detailed explanations will now be given of the components that constitute the polycarbonate resin composition, the optical component, and the like, of the present invention.

[Polycarbonate Copolymer (B) Having Carbonate Bonding Between (B1) Bisphenol A and (B2) Polyalkylene Glycol]

The polycarbonate copolymer (B) used in the present invention is a polycarbonate copolymer having carbonate bonding between (B1) bisphenol A and a (B2) polyalkylene glycol.

The mass ratio of the (B1) bisphenol A and the (B2) polyalkylene glycol that constitute the polycarbonate copolymer (B) is such that relative to a total of 100 mass % of components (B1) and (B2), the proportion of component (B1) is preferably not less than 5 mass % and less than 50 mass % and the proportion of component (B2) is preferably more than 50 mass % and not more than 95 mass %, the proportion of component (B1) is more preferably 5 mass % to 40 mass % and the proportion of component (B2) is more preferably 60 mass % to 95 mass %, and the proportion of component (B1) is further preferably 5 mass % to 35 mass % and the proportion of component (B2) is further preferably 65 mass % to 95 mass %. The hue of the polycarbonate resin composition deteriorates if the proportion of the (B2) polyalkylene glycol is 50 mass % or less, and white turbidness readily occurs if the proportion of the (B2) polyalkylene glycol exceeds 95 mass %.

The polycarbonate copolymer (B) is preferably a polycarbonate copolymer constituted from polycarbonate units derived from bisphenol A and polycarbonate units derived from a polyalkylene glycol (the X—O portion in the formula below), as shown by formula (PC-B) below. In the formula, m is an integer of 1 to 200, n is an integer of 6 to 100, 1 is an integer of 1 to 200, and it is preferable for the value of m to be 5 to 100, the value of n to be 8 to 70 and the value of 1 to be 3 to 100.

[C1]

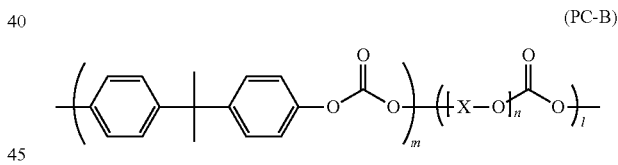

(PC-B)

The polycarbonate copolymer (B) can be produced using a commonly used production method, such as an interfacial polymerization method or a melt polymerization method, and can be produced by means of a method comprising, for example, reacting at least (B1) bisphenol A, a (B2) polyalkylene glycol and a carbonate precursor such as phosgene or diphenyl carbonate.

A variety of polyalkylene glycols can be used as the (B2) polyalkylene glycol, and preferred examples thereof include branched polyalkylene glycols represented by general formula (1) below and straight chain polyalkylene glycols represented by general formula (2) below.

[C2]

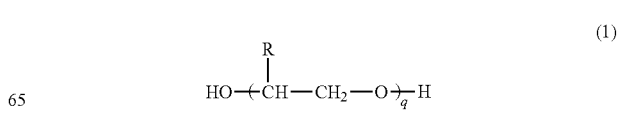

(1)

In the formula, R denotes an alkyl group having 1 to 3 carbon atoms, and q denotes an integer of 10 to 400.

A branched polyalkylene glycol represented by general formula (1) above may be a homopolymer comprising a single type of R moiety or a copolymer comprising different types of R moieties.

(2-methyl)ethylene glycol, in which R in general formula (1) is a methyl group, and (2-ethyl)ethylene glycol, in which R in general formula (1) is an ethyl group, are preferred as branched polyalkylene glycols.

Examples of commercially available branched polyalkylene glycols represented by general formula (1) above include the products "Uviol D-1000" and "Uviol PB-1000" available from NOF Corp.

[C3]

(2)

In the formula, p denotes an integer of 2 to 6, and r denotes an integer of 6 to 100.

A straight chain polyalkylene glycol represented by general formula (2) above may be a homopolymer in which the value for p is singular or may be a copolymer in which the values of p is plural including different values.

Preferred examples of straight chain polyalkylene glycols include polyethylene glycol, in which the value of p in general formula (2) is 2, polytrimethylene glycol, in which the value of p in general formula (2) is 3, polytetramethylene glycol, in which the value of p in general formula (2) is 4, polypentamethylene glycol, in which the value of p in general formula (2) is 5, and polyhexamethylene glycol, in which the value of p in general formula (2) is 6, and polytetramethylene glycol is more preferred.

Examples of commercially available straight chain polyalkylene glycols include the products "PEG" available from NOF Corp. and "PTMG" available from Mitsubishi Chemical Corporation.

Polyalkylene glycol copolymers having straight chain alkylene ether units (P1) represented by general formula (3) below and branched alkylene ether units (P2) selected from among units represented by general formulae (4-1) to (4-4) below can also be given as preferred examples of the (B2) polyalkylene glycol.

[C4]

(3)

In formula (3), p denotes an integer of 2 to 6.

A straight chain alkylene ether unit represented by general formula (3) can be a single unit in which the value for p is singular or a mixture of a plurality of units having different values for p.

[C5]

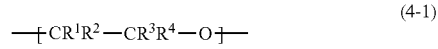
(4-1)

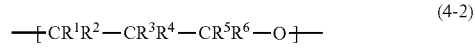
(4-2)

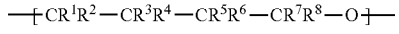
(4-3)

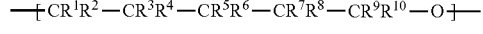
(4-4)

In formulae (4-1) to (4-4), $R^1$ to $R^{10}$ each independently denote a hydrogen atom or an alkyl group having 1 to 3 carbon atoms, and in formulae (4-1) to (4-4), at least one of $R^1$ to $R^{10}$ is an alkyl group having 1 to 3 carbon atoms.

Branched alkylene ether units represented by general formulae (4-1) to (4-4) can be homopolymers constituted from branched alkylene ether units having one structure selected from among general formulae (4-1) to (4-4) or copolymers constituted from branched alkylene ether units having a plurality of these structures.

If glycols are listed as examples of straight chain alkylene ether units (P1) represented by general formula (3) above, examples thereof include ethylene glycol, in which the value of p is 2, triethylene glycol, in which the value of p is 3, tetramethylene glycol, in which the value of p is 4, pentamethylene glycol, in which the value of p is 5, and hexamethylene glycol, in which the value of p is 6, and these may be mixed, and trimethylene glycol and tetramethylene glycol are more preferred, with tetramethylene glycol being particularly preferred.

Trimethylene glycol can be industrially produced using a method comprising hydroformylation of ethylene oxide so as to obtain 3-hydroxypropionaldehyde and then hydrogenating the 3-hydroxypropionaldehyde, or a method comprising hydrating acrolein so as to obtain 3-hydroxypropionaldehyde and then hydrogenating the 3-hydroxypropionaldehyde using a Ni catalyst. In addition, trimethylene glycol has also been produced recently using a bio-method comprising chemically reducing glycerin, glucose, starch, or the like, using microorganisms.

If glycols are listed as examples of branched chain alkylene ether units represented by general formula (4-1) above, examples thereof include (2-methyl)ethylene glycol, (2-ethyl)ethylene glycol and (2,2-dimethyl)ethylene glycol, and these may be mixed, and (2-methyl)ethylene glycol and (2-ethyl)ethylene glycol are preferred.

If glycols are listed as examples of branched chain alkylene ether units represented by general formula (4-2) above, examples thereof include (2-methyl)trimethylene glycol, (3-methyl) trimethylene glycol, (2-ethyl) trimethylene glycol, (3-ethyl)trimethylene glycol, (2,2-dimethyl) trimethylene glycol, (2,2-methylethyl)trimethylene glycol, (2,2-diethyl)trimethylene glycol (that is, neopentyl glycol), (3,3-dimethyl)trimethylene glycol, (3,3-methylethyl)trimethylene glycol and (3,3-diethyl)trimethylene glycol, and these may be mixed.

If glycols are listed as examples of branched chain alkylene ether units represented by general formula (4-3) above, examples thereof include (3-methyl)tetramethylene glycol, (4-methyl)tetramethylene glycol, (3-ethyl)tetramethylene glycol, (4-ethyl)tetramethylene glycol, (3,3-dimethyl) tetramethylene glycol, (3,3-methylethyl)tetramethylene glycol, (3,3-diethyl)tetramethylene glycol, (4,4-dimethyl) tetramethylene glycol, (4,4-methylethyl)tetramethylene glycol and (4,4-diethyl)tetramethylene glycol, and these may be mixed, and (3-methyl)tetramethylene glycol is preferred.

If glycols are listed as examples of branched chain alkylene ether units represented by general formula (4-4) above, examples thereof include (3-methyl)pentamethylene glycol, (4-methyl)pentamethylene glycol, (5-methyl)pentamethylene glycol, (3-ethyl)pentamethylene glycol, (4-ethyl)pentamethylene glycol, (5-ethyl)pentamethylene glycol, (3,3-dimethyl)pentamethylene glycol, (3,3-methylethyl)pentamethylene glycol, (3,3-diethyl)pentamethylene glycol, (4,4-dimethyl)pentamethylene glycol, (4,4-methylethyl)pentamethylene glycol, (4,4-diethyl)pentamethylene glycol, (5,5-dimethyl)pentamethylene glycol, (5,5-methylethyl)pentamethylene glycol and (5,5-diethyl)pentamethylene glycol, and these may be mixed.

For the sake of convenience, glycols have been listed above as examples of units represented by general formulae (4-1) to (4-4) that constitute branched alkylene ether units, but these branched alkylene ether units are not limited to these glycols, and may also be alkylene oxides or polyetherforming derivatives of these.

Preferred examples of polyalkylene glycol copolymers include copolymers comprising tetramethylene ether units and units represented by general formula (4-3) above, with a copolymer comprising tetramethylene ether units and 3-methyltetramethylene ether units being particularly preferred. In addition, copolymers comprising tetramethylene ether units and units represented by general formula (4-1) above are also preferred, with a copolymer comprising tetramethylene ether units and 2-methylethylene ether units and a copolymer comprising tetramethylene ether units and 2-ethylethylene ether units being particularly preferred. Furthermore, copolymers comprising tetramethylene ether units and units represented by general formula (4-2) above are also preferred, and a copolymer comprising 2,2-dimethyltrimethylene ether units, that is, neopentyl glycol ether units is also preferred.

The polyalkylene glycol copolymer may be a random copolymer or a block copolymer.

The copolymerization ratio of straight chain alkylene ether units (P1) represented by general formula (3) above and branched alkylene ether units (P2) represented by general formulae (4-1) to (4-4) above in the polyalkylene glycol copolymer is such that the (P1)/(P2) molar ratio is preferably 95/5 to 5/95, more preferably 93/7 to 40/60, and further preferably 90/10 to 65/35, and it is more preferable for the copolymer to be rich in straight chain alkylene ether units (P1).

Moreover, the molar ratio is measured by means of a $^1$H-NMR measurement apparatus using deuterated chloroform as a solvent.

Of the compounds listed above, particularly preferred examples of the (B2) polyalkylene glycol include homopolymers such as polytrimethylene glycol, poly(2-methyl)ethylene glycol, poly(2-ethyl)ethylene glycol and polytetramethylene glycol; and copolymers such as polytetramethylene glycol-polyethylene glycol, polytetramethylene glycol-polytrimethylene glycol, polytetramethylene glycol-poly(2-methyl)ethylene glycol, polytetramethylene glycol-poly(3-methyl)tetramethylene glycol, polytetramethylene glycol-poly(2-ethyl) ethylene glycol, polytetramethylene glycol-polyneopentyl glycol, polyethylene glycol-polytrimethylene glycol and polyethylene glycol-poly(2-methyl)ethylene glycol.

The (B2) polyalkylene glycol may contain structures derived from polyols such as 1,4-butane diol, glycerol, sorbitol, benzene diol, bisphenol A, cyclohexane diol and spiroglycol in the structure. By adding these polyols during polymerization of the polyalkylene glycol, organic groups in these polyols can be supplied to the main chain. Particularly preferred examples include glycerol, sorbitol and bisphenol A.

Preferred examples of polyalkylene glycols having organic groups in the structure thereof include polyethylene glycol glyceryl ether, poly(2-methyl)ethylene glycol glyceryl ether, poly(2-ethyl)ethylene glycol glyceryl ether, polytetramethylene glycol glyceryl ether, polyethylene glycol-poly(2-methyl)ethylene glycol glyceryl ether, polytetramethylene glycol-poly(2-methyl)ethylene glycol glyceryl ether, polytetramethylene glycol-poly(2-ethyl) polyethylene glycol glyceryl ether, polyethylene glycol sorbityl ether, poly(2-methyl)ethylene glycol sorbityl ether, poly(2-ethyl)ethylene glycol sorbityl ether, polytetramethylene glycol sorbityl ether, polyethylene glycol-poly(2-methyl)ethylene glycol sorbityl ether, polytetramethylene glycol-poly(2-methyl)ethylene glycol sorbityl ether, polytetramethylene glycol-poly(2-ethyl)ethylene glycol sorbityl ether, bisphenol A-bis(polyethylene glycol) ether, bisphenol A-bis(poly(2-methyl)ethylene glycol) ether, bisphenol A-bis(poly(2-ethyl)ethylene glycol) ether, bisphenol A-bis(polytetramethylene glycol) ether, bisphenol A-bis(polyethylene glycol-poly(2-methyl) ethylene glycol) ether, bisphenol A-bis(polytetramethylene glycol-poly(2-methyl)ethylene glycol) ether and bisphenol A-bis(polytetramethylene glycol-poly(2-ethyl)polyethylene glycol) ether.

The weight average molecular weight (Mw) of the (B2) polyalkylene glycol is preferably 600 to 8,000, and is more preferably 800 or more, and further preferably 1,000 or more, and is more preferably 6,000 or less, further preferably 5,000 or less, and particularly preferably 4,000 or less. If the weight average molecular weight exceeds the upper limit mentioned above, compatibility tends to decrease. If the weight average molecular weight is lower than the lower limit mentioned above, the impact properties of the composition decrease.

Moreover, the weight average molecular weight (Mw) is the molecular weight in terms of polystyrene, as measured by means of gel permeation chromatography (GPC) in a THF developing solvent.

Specifically, the weight average molecular weight is a value determined as molecular weight in terms of polystyrene using an "HLC-8320" high-speed GPC apparatus available from Tosoh Corporation as a GPC apparatus, three HZ-M (4.6 mm×150 mm) columns available from Tosoh Corporation in series as columns, and chloroform as an eluant.

Among the monomers that serve as raw materials for the polycarbonate copolymer (B), examples of the polycarbonate precursor include carbonyl halides and carbonate esters. Moreover, the carbonate precursor may be a single type or a combination of two or more arbitrary types thereof combined at arbitrary proportions.

Specific examples of carbonyl halides include phosgene; and haloformates such as bischloroformates of dihydroxy compounds and monochloroformates of dihydroxy compounds.

Specific examples of carbonate esters include diaryl carbonate compounds such as diphenyl carbonate and ditolyl carbonate; dialkyl carbonate compounds such as dimethyl carbonate and diethyl carbonate; and carbonates of dihydroxy compounds, such as biscarbonates of dihydroxy compounds, monocarbonates of dihydroxy compounds and cyclic carbonates.

A bisphenol A-polytetramethylene glycol copolycarbonate represented by formula (PC-B1) below is particularly preferred as the polycarbonate copolymer (B). In formula (PC-B1), m, n and 1 are defined in the same way as in formula (PC-B) above, and it is preferable for the value of m to be 1 to 200, the value of n to be 6 to 100, and the value of 1 to be 1 to 200.

[C6]

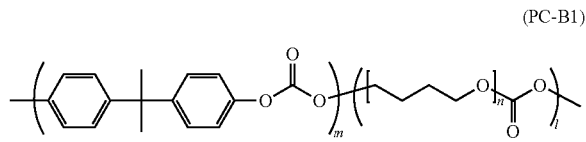

(PC-B1)

The method for producing the polycarbonate copolymer (B) is not particularly limited, and an arbitrary publicly known method can be used. Examples thereof include interfacial polymerization methods, melt transesterification methods, the pyridine process, ring opening polymerization of cyclic carbonate compounds, and solid phase transesterification of prepolymers. Of these, melt transesterification methods and interfacial polymerization methods are preferred, with melt transesterification methods being more preferred.

The weight average molecular weight (Mw) of the polycarbonate copolymer (B) is preferably 5,000 to 40,000, and is more preferably 6,000 or more, and further preferably 7,000 or more, and is more preferably 37,000 or less, further preferably 35,000 or less, particularly preferably 30,000 or less, and most preferably 25,000 or less. If the weight average molecular weight (Mw) exceeds the upper limit mentioned above, compatibility tends to decrease. If the weight average molecular weight is lower than the lower limit mentioned above, gas tends to be produced at the time of molding.

The weight average molecular weight (Mw) of the polycarbonate copolymer (B) can be adjusted by selecting the Mw value of the (B2) polyalkylene glycol that is a comonomer diol raw material, adjusting the proportion of the carbonate precursor, adding a terminator, adjusting the temperature or pressure at the time of polymerization, or the like, and in order to increase the Mw value in, for example, a melt transesterification method, it is possible to adjust the monomer raw material proportions so that the reaction ratio of diphenyl carbonate, which is a carbonate precursor, and a diol monomer is close to 1, maintain a high polymerization temperature so as to facilitate removal of by-produced phenol from the polymerization system, lower the pressure as far as possible, and actively carry out interface renewal through agitation.

Moreover, the weight average molecular weight (Mw) of the polycarbonate copolymer (B) is the molecular weight in terms of polystyrene, as measured by means of GPC in a THF developing solvent.

Specifically, the weight average molecular weight is a value determined as molecular weight in terms of polystyrene at a measurement temperature of 25° C. using an "HLC-8320" high-speed GPC apparatus available from Tosoh Corporation as a GPC apparatus, three HZ-M (4.6 mm×150 mm) columns available from Tosoh Corporation in series as columns, and chloroform as an eluant.

The content of the polycarbonate copolymer (B) in the polycarbonate resin composition of the present invention is, relative to 100 parts by mass of the polycarbonate resin (A), 0.1 to 10 parts by mass, and is preferably 0.15 parts by mass or more, and more preferably 0.2 parts by mass or more, and is preferably 7 parts by mass or less, more preferably 5 parts by mass or less, further preferably 3 parts by mass or less, particularly preferably 2 parts by mass or less, and most preferably 1 part by mass or less. Hue and thermal discoloration resistance are inadequate if this content is less than 0.1 parts by mass, and the material suffers from white turbidness and loses transparency if this content exceeds 10 parts by mass.

[Polycarbonate Resin (A)]

The polycarbonate resin (A) used in the present invention is not particularly limited as long as this is different from the polycarbonate copolymer (B) mentioned above, and can be a variety of resins.

Polycarbonate resins can be classified into aromatic polycarbonate resins, in which a carbon atom directly bonded to a carbonate bond is an aromatic carbon atom, and aliphatic polycarbonate resins, in which a carbon atom directly bonded to a carbonate bond is an aliphatic carbon atom. Of these, aromatic polycarbonate resins are preferred as the polycarbonate resin (A) from perspectives such as heat resistance, mechanical properties and electrical properties.

Among monomers that serve as raw materials for aromatic polycarbonate resins, examples of aromatic dihydroxy compounds include:

dihydroxybenzene compounds such as 1,2-dihydroxybenzene, 1,3-dihydroxybenzene (that is, resorcinol) and 1,4-dihydroxybenzene;

dihydroxybiphenyl compounds such as 2,5-dihydroxybiphenyl, 2,2'-dihydroxybiphenyl and 4,4'-dihydroxybiphenyl;

dihydroxynaphthalene compounds such as 2,2'-dihydroxy-1,1'-binaphthyl, 1,2-dihydroxynaphthalene, 1,3-dihydroxynaphthalene, 2,3-dihydroxynaphthalene, 1,6-dihydroxynaphthalene, 2,6-dihydroxynaphthalene, 1,7-dihydroxynaphthalene and 2,7-dihydroxynaphthalene;

dihydroxydiaryl ether compounds such as 2,2'-dihydroxydiphenyl ether, 3,3'-dihydroxydiphenyl ether, 4,4'-dihydroxydiphenyl ether, 4,4'-dihydroxy-3,3'-dimethyldiphenyl ether, 1,4-bis(3-hydroxyphenoxy)benzene and 1,3-bis(4-hydroxyphenoxy)benzene;

bis(hydroxyaryl)alkanes such as 2,2-bis(4-hydroxyphenyl)propane (that is, bisphenol A),
1,1-bis(4-hydroxyphenyl)propane,
2,2-bis(3-methyl-4-hydroxyphenyl)propane,
2,2-bis(3-methoxy-4-hydroxyphenyl)propane,
2-(4-hydroxyphenyl)-2-(3-methoxy-4-hydroxyphenyl)propane,
1,1-bis(3-tert-butyl-4-hydroxyphenyl)propane,
2,2-bis(3,5-dimethyl-4-hydroxyphenyl)propane,
2,2-bis(3-cyclohexyl-4-hydroxyphenyl)propane,
2-(4-hydroxyphenyl)-2-(3-cyclohexyl-4-hydroxyphenyl)propane,
α,α'-bis(4-hydroxyphenyl)-1,4-diisopropylbenzene,
1,3-bis[2-(4-hydroxyphenyl)-2-propyl]benzene,
bis(4-hydroxyphenyl)methane,
bis(4-hydroxyphenyl)cyclohexylmethane,
bis(4-hydroxyphenyl)phenylmethane,
bis(4-hydroxyphenyl)(4-propenylphenyl)methane,
bis(4-hydroxyphenyl)diphenylmethane,
bis(4-hydroxyphenyl)naphthylmethane,
1,1-bis(4-hydroxyphenyl)ethane,
1,1-bis(4-hydroxyphenyl)-1-phenylethane,
1,1-bis(4-hydroxyphenyl)-1-naphthylethane,
1,1-bis(4-hydroxyphenyl)butane,
2,2-bis(4-hydroxyphenyl)butane,
2,2-bis(4-hydroxyphenyl)pentane,
1,1-bis(4-hydroxyphenyl)hexane,
2,2-bis(4-hydroxyphenyl)hexane,
1,1-bis(4-hydroxyphenyl)octane, 2,2-bis(4-hydroxyphenyl)octane,
4,4-bis(4-hydroxyphenyl)heptane,
2,2-bis(4-hydroxyphenyl)nonane,
1,1-bis(4-hydroxyphenyl)decane, and
1,1-bis(4-hydroxyphenyl)dodecane;
bis(hydroxyaryl)cycloalkanes such as
1,1-bis(4-hydroxyphenyl)pentane,
1,1-bis(4-hydroxyphenyl)cyclohexane,
1,1-bis(4-hydroxyphenyl)-3,3-dimethylcyclohexane,
1,1-bis(4-hydroxyphenyl)-3,4-dimethylcyclohexane,
1,1-bis(4-hydroxyphenyl)-3,5-dimethylcyclohexane,
1,1-bis(4-hydroxyphenyl)-3,3,5-trimethylcyclohexane,
1,1-bis(4-hydroxy-3,5-dimethylphenyl)-3,3,5-trimethylcyclohexane,
1,1-bis(4-hydroxyphenyl)-3-propyl-5-methylcyclohexane,
1,1-bis(4-hydroxyphenyl)-3-tert-butyl-cyclohexane,
1,1-bis(4-hydroxyphenyl)-4-tert-butyl-cyclohexane,
1,1-bis(4-hydroxyphenyl)-3-phenylcyclohexane, and
1,1-bis(4-hydroxyphenyl)-4-phenylcyclohexane;
cardo structure-containing bisphenol compounds such as
9,9-bis(4-hydroxyphenyl)fluorene and
9,9-bis(4-hydroxy-3-methylphenyl)fluorene;
dihydroxydiaryl sulfide compounds such as
4,4'-dihydroxydiphenyl sulfide and
4,4'-dihydroxy-3,3'-dimethyldiphenyl sulfide;
dihydroxydiaryl sulfoxide compounds such as 4,4'-dihydroxydiphenyl sulfoxide and 4,4'-dihydroxy-3,3'-dimethyldiphenyl sulfoxide; and
dihydroxydiaryl sulfone compounds such as
4,4'-dihydroxydiphenyl sulfone and
4,4'-dihydroxy-3,3'-dimethyldiphenyl sulfone.

Of these, bis(hydroxyaryl)alkane compounds are preferred, and of these, bis(4-hydroxyphenyl)alkane compounds are preferred and 2,2-bis(4-hydroxyphenyl)propane (that is, bisphenol A) is particularly preferred from the perspectives of impact resistance and heat resistance.

Moreover, the aromatic dihydroxy compound may be a single type or a combination of two or more arbitrary types thereof combined at arbitrary proportions.

Among monomers that serve as raw materials for polycarbonate resins, examples of polycarbonate precursors include carbonyl halides and carbonate esters. Moreover, the carbonate precursor may be a single type or a combination of two or more arbitrary types thereof combined at arbitrary proportions.

Specific examples of carbonyl halides include phosgene; and haloformates such as bischloroformates of dihydroxy compounds and monochloroformates of dihydroxy compounds.

Specific examples of carbonate esters include diaryl carbonate compounds such as diphenyl carbonate and ditolyl carbonate; dialkyl carbonate compounds such as dimethyl carbonate and diethyl carbonate; and carbonates of dihydroxy compounds, such as biscarbonates of dihydroxy compounds, monocarbonates of dihydroxy compounds and cyclic carbonates.

The method for producing the polycarbonate resin (A) is not particularly limited, and an arbitrary method can be used. Examples thereof include interfacial polymerization methods, melt transesterification methods, the pyridine process, ring opening polymerization of cyclic carbonate compounds, and solid phase transesterification of prepolymers. Of these, interfacial polymerization methods are particularly preferred.

The molecular weight of the polycarbonate resin (A) is such that the viscosity average molecular weight (Mv), as calculated from solution viscosity measured at a temperature of 25° C. using methylene chloride as a solvent, is preferably 10,000 to 26,000, and is more preferably 10,500 or more, further preferably 11,000 or more, particularly preferably 11,500 or more, and most preferably 12,000 or more, and is more preferably 24,000 or less, and further preferably 20,000 or less. By setting the viscosity average molecular weight to be not lower than the lower limit of the range mentioned above, it is possible to further increase the mechanical strength of the polycarbonate resin composition of the present invention, and by setting this viscosity average molecular weight to be not higher than the upper limit of the range mentioned above, it is possible to better suppress a decrease in fluidity of the polycarbonate resin composition of the present invention, increase molding processing properties, and facilitate thin wall molding.

Moreover, it is possible to use a mixture of two or more types of polycarbonate resin having different viscosity average molecular weights, and in such cases, it is possible to mix polycarbonate resins whose viscosity average molecular weights fall outside the preferred range mentioned above.

Moreover, the viscosity average molecular weight [Mv] is a value obtained by determining the intrinsic viscosity [η] (units: dl/g) at 25° C. using a Ubbelohde type viscometer using methylene chloride as a solvent, and then calculating the viscosity average molecular weight from the Schnell viscosity equation, that is, $\eta=1.23\times10^{-4}$ $Mv^{0.03}$. In addition, the intrinsic viscosity $[\eta_{sp}]$ is a value obtained by measuring the specific viscosity $[\eta_{sp}]$ at a number of solution concentrations [C] (g/dl) and calculating the intrinsic viscosity from the following expression.

$$\eta = \lim_{c \to 0} \eta_{sp}/c \qquad [\text{Math. 1}]$$

The terminal hydroxyl group concentration in the polycarbonate resin (A) is arbitrary and should be selected and decided as appropriate, but is generally 1,000 ppm or less, preferably 800 ppm or less, and more preferably 600 ppm or less. Due to this configuration, it is possible to further improve the residual thermal stability and color tone of the polycarbonate resin. In addition, the lower limit thereof is generally 10 ppm or more, preferably 30 ppm or more, and more preferably 40 ppm or more, for a polycarbonate resin produced using a melt transesterification method in particular. Due to this configuration, it is possible to suppress a decrease in molecular weight and further improve the mechanical characteristics of the resin composition.

Moreover, units for terminal hydroxyl group concentration are such that the mass of terminal hydroxyl groups is expressed in terms of ppm relative to the mass of the polycarbonate resin (A). This measurement method is a colorimetric method involving use of a titanium tetrachloride/acetic acid method (this is described in Macromol. Chem. 88 215 (1965)).

In addition, in order to improve the appearance of a molded article or improve the fluidity, the polycarbonate resin (A) may contain a polycarbonate oligomer. The viscosity average molecular weight [Mv] of this polycarbonate oligomer is generally 1,500 or higher, and preferably 2,000 or higher, and is generally 9,500 or lower, and preferably 9,000 or lower. Furthermore, it is preferable for the contained polycarbonate oligomer to account for 30% by mass or less of the polycarbonate resin (including the polycarbonate oligomer).

Furthermore, the polycarbonate resin (A) may use not only virgin raw materials, but also polycarbonate resins regenerated from used products (so-called material-recycled polycarbonate resins).

However, it is preferable for regenerated polycarbonate resins to account for 80 mass % or less, and more preferably 50 mass % or less, of the polycarbonate resin (A). Because regenerated polycarbonate resins are highly likely to have undergone deterioration such as thermal deterioration or age-related deterioration, in cases where such polycarbonate resins are used at quantities in excess of the range mentioned above, it is possible that the hue or mechanical properties will deteriorate.

[Phosphorus-Containing Stabilizer (C)]

The polycarbonate resin composition of the present invention contains a phosphorus-containing stabilizer (C). By incorporating a phosphorus-containing stabilizer, the color hue of the polycarbonate resin composition of the present invention is improved, and thermal discoloration resistance is further improved.

Any publicly known phosphorus-containing stabilizer can be used as the phosphorus-containing stabilizer. Specific examples thereof include oxoacids of phosphorus, such as phosphoric acid, phosphonic acid, phosphorous acid, phosphinic acid and polyphosphoric acid; acidic metal pyrophosphate salts, such as acidic sodium pyrophosphate, acidic potassium pyrophosphate and acidic calcium pyrophosphate; phosphate salts of group 1 or group 2B metals, such as potassium phosphate, sodium phosphate, cesium phosphate and zinc phosphate; phosphate compounds, phosphite compounds and phosphonite compounds, but phosphite compounds are particularly preferred. By selecting a phosphite compound, it is possible to obtain a polycarbonate resin composition which has higher discoloration resistance and suitability for continuous production.

Here, the phosphite compound is a trivalent phosphorus compound represented by the general formula $P(OR)_3$, and R denotes a monovalent or divalent organic group.

Examples of such phosphite compounds include triphenyl phosphite, tris(monononylphenyl) phosphite, tris(mononyl/dinonylphenyl) phosphite, tris(2,4-di-tert-butylphenyl) phosphite, monooctyldiphenyl phosphite, dioctylmonophenyl phosphite, monodecyldiphenyl phosphite, didecylmonophenyl phosphite, tridecyl phosphite, trilauryl phosphite, tristearyl phosphite, distearylpentaerythritol diphosphite, bis(2,4-di-tert-butyl-4-methylphenyl)pentaerythritol phosphite, bis(2,6-di-tert-butylphenyl)octyl phosphite, 2,2-methylenebis(4,6-di-tert-butylphenyl)octyl phosphite, tetrakis(2,4-di-tert-butylphenyl)-4,4'-biphenylene-diphosphite and 6-[3-(3-tert-butyl-hydroxy-5-methylphenyl)propoxy]-2,4,8,10-tetra-tert-butyldibenzo[d,f][1,3,2]-dioxaphosphepin.

Among such phosphite compounds, aromatic phosphite compounds represented by formula (5) and formula (6) are more preferred from the perspective of effectively increasing thermal discoloration resistance of the polycarbonate resin composition of the present invention.

[C7]

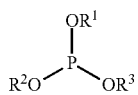

(3)

In formula (5), $R^1$, $R^2$ and $R^3$ may be the same as, or different from, each other, and each denote an aryl group having 6 to 30 carbon atoms.

[C8]

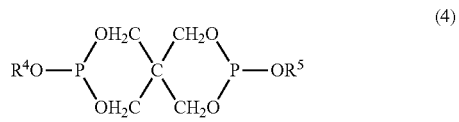

(4)

In formula (6), $R^4$ and $R^5$ may be the same as, or different from, each other, and each denote an aryl group having 6 to 30 carbon atoms.

Among phosphite compounds represented by formula (5) above, triphenyl phosphite, tris(monononylphenyl) phosphite, tris(2,4-di-tert-butylphenyl) phosphite, and the like, are preferred, and of these, tris(2,4-di-tert-butylphenyl) phosphite is more preferred. Specific examples of such organic phosphite compounds include "Adekastab 1178" available from ADEKA Corporation, "Sumilizer TNP" available from Sumitomo Chemical Co., Ltd., "JP-351" available from Johoku Chemical Co., Ltd., "Adekastab 2112" available from ADEKA Corporation, "Irgafos 168" available from BASF, and "JP-650" available from Johoku Chemical Co., Ltd.

Particularly preferred examples of phosphite compounds represented by formula (6) include compounds having a pentaerythritol diphosphite structure, such as bis(2,4-di-tert-butyl-4-methylphenyl)pentaerythritol diphosphite, bis(2,6-di-tert-butyl-4-methylphenyl)pentaerythritol diphosphite and bis(2,4-dicumylphenyl)pentaerythritol diphosphite. Specific preferred examples of such organic phosphite compounds include "Adekastab PEP-24G" and "Adekastab PEP-36" available from ADEKA Corporation and "Doverphos S-9228" available from Dover Chemical Corporation.

Among phosphite compounds, aromatic phosphite compounds represented by formula (6) above are more preferred from the perspective of superior color hue.

Moreover, it is possible to incorporate one phosphorus-containing stabilizer or an arbitrary combination of two or more types thereof combined at arbitrary proportions.

The content of the phosphorus-containing stabilizer (C) is, relative to 100 parts by mass of the polycarbonate resin (A), 0.005 to 0.5 parts by mass, and is preferably 0.007 parts by mass or more, more preferably 0.008 parts by mass or more, and particularly preferably 0.01 parts by mass or more, and is preferably 0.4 parts by mass or less, more preferably 0.3 parts by mass or less, further preferably 0.2 parts by mass or less, and particularly preferably 0.1 parts by mass or less. If the content of the phosphorus-containing stabilizer (C) is less than 0.005 parts by mass, color hue and thermal discoloration resistance are inadequate, and if the content of the phosphorus-containing stabilizer (C) exceeds 0.5 parts by mass, thermal discoloration resistance deteriorates and wet heat stability also deteriorates.

<Epoxy Compound (D)/Oxetane Compound (E)>

It is preferable for the resin composition of the present invention to further contain an epoxy compound (D) and/or an oxetane compound (E). By incorporating the epoxy compound (D) and/or oxetane compound (E) together with the polyalkylene glycol polymer (B), it is possible to further improve thermal discoloration resistance.

<Epoxy Compound (D)>

A compound having one or more epoxy groups per molecule can be used as the epoxy compound (D). Specifically, phenyl glycidyl ether, allyl glycidyl ether, t-butylphenyl glycidyl ether, 3,4-epoxycyclohexylmethyl-3',4'-epoxycyclohexyl carboxylate, 3,4-epoxy-6-methylcyclohexylmethyl-3',4'-epoxy-6'-methylcyclohexyl carboxylate, 2,3-epoxycyclohexylmethyl-3',4'-epoxycyclohexyl carboxylate, 4-(3,4-epoxy-5-methylcyclohexyl)butyl-3',4'-epoxycyclohexyl carboxylate, 3,4-epoxycyclohexylethylene oxide, cyclohexylmethyl3,4-epoxycyclohexyl carboxylate, 3,4-epoxy-6-methylcyclohexylmethyl-6'-methylcyclohexyl carboxylate, bisphenol A diglycidyl ether, tetrabromobisphenol A glycidyl ether, phthalic acid diglycidyl ester, hexahydrophthalic acid diglycidyl ester, bis-epoxydicyclopentadienyl ether, bis-epoxyethylene glycol, bis-epoxycyclohexyl adipate, butadiene diepoxide, tetraphenylethylene epoxide, octyl epoxy tallate, epoxidized polybutadiene, 3,4-dimethyl-1,2-epoxycyclohexane, 3,5-dimethyl-1,2-epoxycyclohexane, 3-methyl-5-t-butyl-1,2-epoxycyclohexane, octadecyl-2,2-dimethyl-3,4-epoxycyclohexyl carboxylate, N-butyl-2,2-dimethyl-3,4-epoxycyclohexyl carboxylate, cyclohexyl-2-methyl-3,4-epoxycyclohexyl carboxylate, N-butyl-2-isopropyl-3,4-epoxy-5-methylcyclohexyl carboxylate, octadecyl-3,4-epoxycyclohexyl carboxylate, 2-ethylhexyl-3',4'-epoxycyclohexyl carboxylate, 4,6-dimethyl-2,3-epoxycyclohexyl-3',4'-epoxycyclohexyl carboxylate, 4,5-epoxytetrahydrophthalic acid anhydride, 3-t-butyl-4,5-epoxytetrahydrophthalic acid anhydride, diethyl-4,5-epoxy-cis-1,2-cyclohexyl dicarboxylate, di-n-butyl-3-t-butyl-4,5-epoxy-cis-1,2-cyclohexyl dicarboxylate, epoxidized soy bean oil, epoxidized linseed oil, and the like, can be advantageously used.

Of these, alicyclic epoxy compounds can be advantageously used, and 3,4-epoxycyclohexylmethyl-3',4'-epoxycyclohexyl carboxylate is particularly preferred.

In addition, a polyalkylene glycol derivative having an epoxy group at one terminal or both terminals can be advantageously used. A polyalkylene glycol having an epoxy group at both terminals is particularly preferred.

Preferred examples of polyalkylene glycol derivatives having an epoxy group in the structure include polyalkylene glycol derivatives such as polyethylene glycol diglycidyl ether, poly(2-methyl)ethylene glycol diglycidyl ether, poly(2-ethyl)ethylene glycol diglycidyl ether, polytetramethylene glycol diglycidyl ether, polyethylene glycol-poly(2-methyl)ethylene glycol diglycidyl ether, polytetramethylene glycol-poly(2-methyl)ethylene glycol diglycidyl ether and polytetramethylene glycol-poly(2-ethyl)ethylene glycol diglycidyl ether.

It is possible to use one of these epoxy compounds in isolation, or a combination of two or more types thereof.

<Oxetane Compound (E)>

Any compound having one or more oxetane groups in the molecule can be used as the oxetane compound, and monooxetane compounds having one oxetane group in the molecule and polyoxetane compounds having two or more oxetane groups in the molecule can be used.

Preferred examples of monooxetane compounds include compounds represented by general formulae (I-a) and (I-b) below. Preferred examples of polyoxetane compounds include dioxetane compounds having two oxetane groups in the molecule, which are represented by general formula (II) below.

[C9]

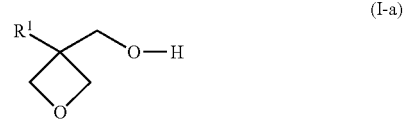

(I-a)

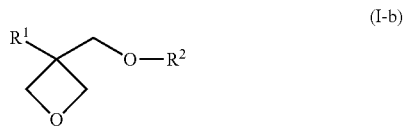

(I-b)

[C10]

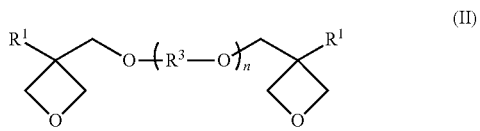

(II)

In the formulae, $R^1$ denotes an alkyl group, $R^2$ denotes an alkyl group or a phenyl group, $R^3$ denotes a divalent organic group that may have an aromatic ring, and the value of n is 0 or 1.

In general formulae (I-a), (I-b) and (II) above, $R^1$ is an alkyl group, but is preferably an alkyl group having 1 to 6 carbon atoms, is more preferably a methyl group or an ethyl group, and is particularly preferably an ethyl group.

In general formula (I-b) above, $R^2$ is an alkyl group or a phenyl group, but is preferably an alkyl group having 2 to 10 carbon atoms, and may be a chain-like alkyl group, a branched alkyl group or an alicyclic alkyl group, and may be a chain-like or branched alkyl group having an ether bond (an etheric oxygen atom) in the alkyl chain. Specific examples of $R^2$ include an ethyl group, a propyl group, a butyl group, a pentyl group, a hexyl group, a heptyl group, an octyl group, a 2-ethylhexyl group, a nonyl group, a decyl group, a 3-oxypentyl group, a cyclohexyl group and a phenyl group. Of these, $R^2$ is preferably a 2-ethylhexyl group, a phenyl group or a cyclohexyl group.

Preferred specific examples of compounds represented by general formula (I-a) include 3-hydroxymethyl-3-methyloxetane, 3-hydroxymethyl-3-ethyloxetane, 3-hydroxymethyl-3-propyloxetane and 3-hydroxymethyl-3-n-butyloxetane. Of these, 3-hydroxymethyl-3-methyloxetane, 3-hydroxymethyl-3-ethyloxetane, and the like, are particularly preferred.

3-ethyl-3-(2-ethylhexyloxymethyl)oxetane, or the like, is particularly preferred as a specific example of the compound represented by general formula (I-b).

In general formula (II) above, $R^3$ is a divalent organic group that may have an aromatic ring, but examples thereof include straight chain or branched alkylene groups having 1 to 12 carbon atoms, such as an ethylene group, a propylene group, a butylene group, a neopentylene group, a n-pentamethylene group or a n-hexamethylene group; a phenylene group; a divalent group represented by the formula —$CH_2$-Ph-$CH_2$— or —$CH_2$-Ph-Ph-$CH_2$— (here, Ph denotes a phenyl group); a hydrogenated bisphenol A residue; a hydrogenated bisphenol F residue; a hydrogenated bisphenol Z residue; a cyclohexanedimethanol residue and a tricyclodecanedimethanol residue.

Particularly preferred specific examples of compounds represented by general formula (II) include bis(3-methyl-3-oxetanylmethyl) ether, bis(3-ethyl-3-oxetanylmethyl) ether, bis(3-propyl-3-oxetanylmethyl) ether, bis(3-butyl-3-oxetanylmethyl) ether, 1,4-bis[(3-ethyl-3-oxetanylmethoxy)

methyl]benzene, 3-ethyl-3{[(3-ethyloxetan-3-yl)methoxy]methyl}oxetane, 4,4'-bis[(3-ethyl-3-oxetanyl)methoxymethyl]biphenyl and 1,4-bis[(3-ethyl-3-oxetanyl)methoxymethyl]benzene.

It is possible to use one of these oxetane compounds (E) in isolation, or a combination of two or more types thereof.

The content of the epoxy compound (D) and/or oxetane compound (E) (or the total content thereof in cases where the epoxy compound (D) and the oxetane compound (E) are both contained) is, relative to 100 parts by mass of the polycarbonate resin (A), 0.0005 to 0.2 parts by mass, and is more preferably 0.001 parts by mass or more, further preferably 0.003 parts by mass or more, and particularly preferably 0.005 parts by mass or more, and is more preferably 0.15 parts by mass or less, further preferably 0.1 parts by mass or less, and particularly preferably 0.05 parts by mass or less. If the content of the epoxy compound (D) and/or oxetane compound (E) is less than 0.0005 parts by mass, color hue and thermal discoloration resistance tend to be inadequate, and if the content of the epoxy compound (D) and/or oxetane compound (E) exceeds 0.2 parts by mass, thermal discoloration resistance tends to deteriorate and color hue and wet heat stability also tend to deteriorate.

[Additives and the Like]

In addition, the polycarbonate resin composition of the present invention may contain additives in addition to those mentioned above, such as antioxidants, mold-release agents, ultraviolet radiation absorbers, fluorescent brightening agents, pigments, dyes, polymers other than polycarbonate resins, flame retardants, impact resistance-improving agents, anti-static agents, plasticizers and compatibilizers. It is possible to use one of these additives or a mixture of two or more types thereof.

However, in cases where a polymer other than the polycarbonate resin (A) and the polycarbonate copolymer (B) is contained, the content thereof is preferably 20 parts by mass or less, more preferably 10 parts by mass or less, further preferably 5 parts by mass or less, and particularly preferably 3 parts by mass or less, relative to a total of 100 parts by mass of the polycarbonate resin (A) and the polycarbonate copolymer (B).

[Method for Producing Polycarbonate Resin Composition]

Methods for producing the polycarbonate resin composition of the present invention are not limited, and publicly known methods for producing polycarbonate resin compositions can be widely used, an example of which is a method consisting of preliminarily mixing the polycarbonate resin (A), the polycarbonate copolymer (B), the phosphorus-containing stabilizer (C) and other components to be blended as required in any of a variety of mixing machines, such as a tumbler or Henschel mixer, and then melt kneading using a mixer such as a Banbury mixer, a roller, a Brabender, a uniaxial kneading extruder, a biaxial kneading extruder, or a kneader. Moreover, the temperature during the melt kneading is not particularly limited, but is generally within the range 240° C. to 320° C.

[Optical Component]

A variety of optical components can be produced by molding pellets, which are obtained by pelletizing the polycarbonate resin composition of the present invention, using a variety of molding methods. It is also possible to obtain an optical component by directly molding the resin composition that has been melt kneaded in an extruder, without forming pellets.

The polycarbonate resin composition of the present invention exhibits excellent fluidity and hue and causes very little gas generation and mold contamination at the time of molding, and is therefore particularly suitable for forming optical articles, and especially thin-walled optical articles that readily cause mold contamination, by means of injection molding. In general, the resin temperature during injection molding is preferably higher than 260 to 300° C., which is a temperature used for injection molding polycarbonate resins, and a resin temperature of 305° C. to 400° C. is preferred, especially in the case of a thin-walled molded article. The resin temperature is more preferably 310° C. or higher, further preferably 315° C. or higher, and particularly preferably 320° C. or higher, and is more preferably 390° C. or lower. In cases where conventional polycarbonate resin compositions were used, if the resin temperature at the time of molding was increased in order to form a thin-walled molded article, problems occurred, such as yellowing of a molded article, but by using the resin composition of the present invention, it is now possible to produce a thin-walled molded article, and especially a thin-walled optical component, having a good appearance within the temperature range mentioned above.

Moreover, the resin temperature can be taken to be the preset barrel temperature in cases where direct measurement is difficult.

Here, thin-walled molded article generally means a molded article having a sheet-like part having a thickness of 1 mm or less, preferably 0.8 mm or less, and further preferably 0.6 mm or less. Here, the sheet-like part may be flat or curved and, even in the case of a flat surface, may have surface unevenness, and a cross section may have a slanted surface or a wedge-shaped cross section.

Examples of optical components include components of equipment/instruments that directly or indirectly use light sources, such as LEDs, organic EL elements, light bulbs, fluorescent lamps and cathode ray tubes, and light guide plates and members for surface light-emitting bodies are typical examples.

Light guide plates are used for guiding light from light sources such as LEDs in liquid crystal backlight units, a variety of display devices and lighting systems, and uniformly diffuse light from a side surface or back surface by means of protrusions and recesses provided on a surface of the light guide plate, thereby emitting light evenly. Light guide plates are generally planar, and may have protrusions and recesses on a surface thereof.

In general, light guide plates are preferably formed by means of injection molding, ultra high-speed injection molding, injection compression molding, melt extrusion molding (for example, T-die molding) or the like.

A light guide plate formed using the resin composition of the present invention exhibits no white turbidity or decrease in transmittance, has a good hue, and has few molding defects caused by mold contamination.

A light guide plate formed using the polycarbonate resin composition of the present invention can be advantageously used in liquid crystal back light units, a variety of display devices and lighting systems. Examples of such devices include a variety of handheld terminals, such as mobile telephones, mobile notebooks, netbooks, slate PCs, tablet PCs, smartphones and tablets, cameras, watches, laptops, a variety of displays and lighting systems.

In addition, the shape of an optical component may be a film or a sheet, and a specific example thereof is a light guide film.

In addition, a suitable optical component is also a light guide or lens that guides light from a light source such as an LED in a headlamp, rear lamp, fog light, or the like, in a motor vehicle or motorcycle, and the present invention can also be advantageously used in these applications.

A light guide plate formed using the polycarbonate resin composition of the present invention can be advantageously used in liquid crystal back light units, a variety of display devices and lighting systems. Examples of such devices include a variety of handheld terminals, such as mobile telephones, mobile notebooks, netbooks, slate PCs, tablet PCs, smartphones and tablets, cameras, watches, laptops, a variety of displays and lighting systems.

EXAMPLES

The present invention will now be explained in greater detail through the use of examples. However, it should be understood that the present invention is not limited to the examples given below.

The raw materials and evaluation methods used in the examples and comparative examples below are as shown in Table 2.

Polycarbonate copolymers (B11) to (B14), which were produced in Production Examples 1 to 4 below, were used as the polycarbonate copolymer (B).

Production Example 1: Production of Polycarbonate Copolymer (B11)

An amount corresponding to 75 mass % of "PTMG650" available from Mitsubishi Chemical Corporation (Mw: 1,950) as polytetramethylene glycol (hereinafter abbreviated to PTMG), an amount corresponding to 25 mass % of bisphenol A (hereinafter abbreviated to BPA) and diphenyl carbonate (hereinafter abbreviated to DPC) at a molar ratio of 1.05 relative to the amount of diol were added to a polymerization apparatus equipped with a 1 L five-mouthed flask. The pressure in the system was lowered to 0.13 kPaA or less, drying was carried out for 1 hour, and tetramethyl ammonium hydroxide (TMAH.5H$_2$O) was then added as a catalyst at a quantity of 10,000 µmol relative to 1 mole of the diol. The pressure in the system was lowered to 0.13 kPaA or less, drying was carried out for 15 minutes so as to remove water derived from the catalyst, and the pressure inside the polymerization apparatus was then restored with nitrogen. At the point when the pressure-restored polymerization apparatus was placed in an oil bath, polymerization was initiated, the heating/depressurization program shown in Table 1 was carried out, a final temperature of 232° C. and depressurization conditions of 0.13 kPaA or less were maintained using a vacuum pump at full vacuum (F.V.), and polymerization was terminated 240 minutes after polymerization was initiated.

The proportions by mass of a bisphenol A (BPA) constituent component and a polytetramethylene glycol (PTMG) constituent component in the obtained polycarbonate copolymer (B11) were 25 mass % of BPA and 75 mass % of PTMG, and the polycarbonate copolymer had a weight average molecular weight (Mw) of 8,000.

Production Example 2: Production of Polycarbonate Copolymer (B12)

Polymerization was carried out in the same way as in Production Example 1, except that "PTMG1000" available from Mitsubishi Chemical Corporation (Mw: 3,450) was used as the PTMG and the heating/depressurization program shown in Table 1 was used.

The proportions by mass of a bisphenol A (BPA) constituent component and a polytetramethylene glycol (PTMG) constituent component in the obtained polycarbonate copolymer (B12) were 25 mass % of BPA and 75 mass % of PTMG, and the polycarbonate copolymer had a weight average molecular weight (Mw) of 10,300.

Production Example 3: Production of Polycarbonate Copolymer (B13)

Polymerization was carried out in the same way as in Production Example 1, except that "PTMG1500" available from Mitsubishi Chemical Corporation (Mw: 5,400) was used as the PTMG and the heating/depressurization program shown in Table 1 was used.

The proportions by mass of a bisphenol A (BPA) constituent component and a polytetramethylene glycol (PTMG) constituent component in the obtained polycarbonate copolymer (B13) were 25 mass % of BPA and 75 mass % of PTMG, and the polycarbonate copolymer had a weight average molecular weight (Mw) of 9,400.

Production Example 4: Production of Polycarbonate Copolymer (B14)

An amount corresponding to 75 mass % of polytetramethylene glycol available from BASF (Mw: 1,800) as PTMG, an amount corresponding to 25 mass % of bisphenol A (hereinafter abbreviated to BPA) and diphenyl carbonate (hereinafter abbreviated to DPC) at a molar ratio of 1.10 relative to the amount of diol were added to a polymerization apparatus equipped with a 1 L three-mouthed flask. An aqueous solution of Cs$_2$CO$_3$ was added as a catalyst at a quantity of 100 µmol (in terms of Cs) relative to 1 mole of diol. The system was dried for 1 hour, and the pressure inside the polymerization apparatus was then restored with nitrogen. At the point when the pressure-restored polymerization apparatus was placed in an oil bath, polymerization was initiated, the heating/depressurization shown in Table 1 was carried out, a final temperature of 232° C. and depressurization conditions of 0.13 kPaA or less were maintained using a vacuum pump at full vacuum (F.V.), and polymerization was terminated 420 minutes after polymerization was initiated.

The proportions by mass of a bisphenol A (BPA) constituent component and a polytetramethylene glycol (PTMG) constituent component in the obtained polycarbonate copolymer (B14) were 25 mass % of BPA and 75 mass % of PTMG, and the polycarbonate copolymer had a weight average molecular weight (Mw) of 16,000.

TABLE 1

| Time (min) | Production Example 1 Temp. settings (° C.) | Production Example 1 Press. settings (kPaA) | Production Example 2 Temp. settings (° C.) | Production Example 2 Press. settings (kPaA) | Production Example 3 Temp. settings (° C.) | Production Example 3 Press. settings (kPaA) | Production Example 4 Temp. settings (° C.) | Production Example 4 Press. settings (kPaA) |
|---|---|---|---|---|---|---|---|---|
| 0 | 190 | 100 → 27 | 190 | 100 → 27 | 190 | 100 → 27 | 190 | 100 → 27 |
| 20 | 190 → 200 | | 190 → 200 | | 190 → 200 | | 190 → 200 | |
| 30 | 200 → 210 | | 200 → 210 | | 200 → 210 | | 200 → 210 | |
| 40 | | 27 → 24 | | | | | | |
| 45 | | | 210 → 220 | 27 → 24 | 210 → 220 | 27 → 24 | 210 → 220 | 27 → 24 |
| 50 | 210 → 220 | 24 → 20 | | | | | | |
| 60 | | | 220 → 232 | 24 → 20 | 220 → 232 | 24 → 20 | 220 → 232 | 24 → 20 |
| 67 | | | | 20 → 17 | | | | |
| 70 | 220 → 232 | 20 → 17 | | | | | | |
| 75 | | | | | | 20 → 17 | | 20 → 17 |
| 80 | | | | 20 → 17 | | | | |
| 85 | | 17 → 13 | | | | | | |
| 90 | | | | | | 17 → 13 | | 17 → 13 |
| 98 | | 13 → 6 | | | | | | |
| 100 | | | | 17 → 13 | | | | |
| 105 | | 6 → F.V. | | | | 13 → 6 | | 13 → 6 |
| 110 | | | | 13 → 6 | | | | |
| 120 | | | | 6 → F.V. | | 6 → F.V. | | 6 → F.V. |
| 135 | | | | | | | | |
| 150 | | | | | | | | |
| 165 | | | | | | | | |
| 180 | | | | | | | | |
| 195 | | | | | | | | |
| 210 | | | | | | | | |
| 225 | | | | | | | | |
| 135 | | | | | | | | |
| 240 | Completion of polymerization | | Completion of polymerization | | Completion of polymerization | | | |
| 420 | | | | | | | Completion of polymerization | |

TABLE 2

| Component | abbr. | |
|---|---|---|
| Polycarbonate resin (A) | A1 | Aromatic polycarbonate resin obtained by interfacial polymerization using bisphenol A as starting material<br>Product name "H-4000F" from Mitsubishi Engineering-Plastics Corp.<br>Mv: 16,000 |
| | A2 | Aromatic polycarbonate resin obtained by interfacial polymerization using bisphenol A as starting material<br>Product name "S-3000F" from Mitsubishi Engineering-Plastics Corp.<br>Mv: 21,500 |
| | A3 | Aromatic polycarbonate resin obtained by interfacial polymerization using bisphenol A as starting material<br>Product name "H-7000F" from Mitsubishi Engineering-Plastics Corp.<br>Mv: 14,000 |
| Polycarbonate copolymer (B) | B11 | Polycarbonate copolymer produced in Production Example 1<br>Bisphenol A (BPA):polytetramethylene glycol (PTMG) = 25 mass %:75 mass %<br>Mw: 8,000 |
| | B12 | Polycarbonate copolymer produced in Production Example 2<br>BPA:PTMG = 25:75 (mass %)<br>Mw: 10,300 |
| | B13 | Polycarbonate copolymer produced in Production Example 3<br>BPA:PTMG = 25:75 (mass %)<br>Mw: 9,400 |
| | B14 | Polycarbonate copolymer produced in Production Example 4<br>BPA:PTMG = 25:75 (mass %)<br>Mw: 16,000 |
| Polytetramethylene glycol | X1 | Poly tetramethylene glycol<br>"PTMG1500" from Mitsubishi Chemical Corp., Mw: 5,400 |
| | X2 | Polytetramethylene glycol<br>"PTMG650" from Mitsubishi Chemical Corp., Mw: 1,950 |

TABLE 2-continued

| Component | abbr. | |
|---|---|---|
| Phosphorus-containing stabilizer (C) | C1 | Bis(2,6-di-tert-butyl-4-methylphenyl)pentaerythritol diphosphite "Adekastab PEP-36" from ADEKA Corporation |
| | C2 | Tris(2,4-di-tert-butylphenyl) phosphite "Adekastab 2112" from ADEKA Corporation |
| | C3 | Bis(2,4-dicumylphenyl)pentaerythritol diphosphite "Doverphos S-9228PC" from Dover Chemical Corporation |
| Epoxy or oxetane compound (D) | D1 | 3,4-epoxycyclohexylmethyl-3',4'-epoxycyclohexane carboxylate "Celloxide 2021P" from Daicel Corporation |
| | D2 | 3-ethyl-3 {[(3-ethyloxetan-3-yl)methoxy]methyl} oxetane "Aron Oxetane OXT-221" from Toagosei Co. |

Examples 1 to 19 and Comparative Examples 1 to 3

[Production of Resin Composition Pellets]

Pellets were obtained by blending the components listed above at the proportions (parts by mass) shown in Tables 3 and 4 below, mixing for 20 minutes in a tumbler, melt kneading at a cylinder temperature of 240° C. using a vented single screw extruder having a screw diameter of 40 mm (a "VS-40" available from Tanabe Plastics Machinery Co., Ltd.), and then cutting strands.

[Evaluation of Fluidity (Q Value)]

Obtained pellets were dried for 5 hours or longer at 120° C. and then evaluated in terms of fluidity using the method described in Appendix C of JIS K7210 by measuring the flow amount per unit time (Q value; units: $\times 10^{-2}$ cm$^3$/sec) of a composition at a temperature of 240° C. and a load of 160 kgf using an elevated type flow tester. Moreover, a tester having an orifice with a diameter of 1 mm and a length of 10 mm was used.

A higher Q value indicates superior fluidity.

[Measurement of Hue (YI)]

A molded article having a long light path length (measuring 300 mm×7 mm×4 mm) was formed by drying the obtained pellets for 5 to 7 hours at 120° C. using a hot air circulation type dryer and then injection molding using an injection molding machine ("EC100SX-2A" available from Toshiba Machine Company, Ltd.) at a resin temperature of 340° C. and a mold temperature of 80° C.

The YI (yellowness index) of this molded article having a long light path length was measured at a light path length of 300 mm. Measurements were carried out using a long light path length spectrophotometric type transmission color meter ("ASA 1" available from Nippon Denshoku Industries Co., Ltd., C light source, 2° field of view).

[Evaluation of Impact Resistance (Charpy Impact Strength)]

An impact resistance test piece having a thickness of 3 mm was produced on the basis of ISO 179-1,2 by drying obtained pellets for 5 hours at a temperature of 120° C. and then injection molding using an injection molding machine ("NEX80III" available from Nissei Plastic Industrial Co., Ltd.) at a cylinder temperature of 250° C., a die temperature of 80° C. and a molding cycle of 45 seconds. The obtained test piece was subjected to notch cutting to an R value of 1 mm and a depth of 2 mm, and the notched Charpy impact strength (kJ/m$^2$) was measured in an environment having a temperature of 23° C.

[Evaluation of Mold Contamination (Mold Deposits)]

Evaluation of Contamination (Mold Contamination) During Injection Molding

Obtained pellets were dried for 5 hours at 120° C. and then subjected to 200 injection molding shots in an injection molding machine ("SE8 M" available from Sumitomo Heavy Industries, Ltd.) using a droplet-shaped mold such as that shown in FIG. 1 at a cylinder temperature of 340° C., a molding cycle of 10 seconds and a die temperature of 40° C., and following completion of the molding, contamination by white deposits occurring on the metal mirror surface on the stationary die side was visually evaluated and assessed using the following criteria in comparison with Comparative Example 2.

A: Far fewer mold deposits than Comparative Example 2 after 200 molding shots; extremely good mold contamination.

B: Fewer mold deposits than Comparative Example 2 after 200 molding shots, but slight mold contamination resistance observed.

C: Similar level of mold deposits to Comparative Example 2 after 200 molding shots.

D: More mold deposits than Comparative Example 2 after 200 molding shots; significant mold contamination observed.

Moreover, the droplet-shaped mold shown in FIG. 1 is a mold designed so that a resin composition is introduced from a gate G and generated gas can be easily held in the end P portion. The gate G has a width of 1 mm and a thickness of 1 mm, and in FIG. 1, the width h1 is 14.5 mm, the length h2 is 7 mm, the length h3 is 27 mm and the thickness of the molding part is 3 mm.

The evaluation results above are shown in Tables 3 and 4.

TABLE 3

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Polycarbonate resin (A) | A1 | 100 | 100 | 93 | 100 | 96 | 95 | 96 | 100 | 100 | 100 | 100 | 100 |
| | A2 | | | 7 | | 4 | 5 | 4 | | | | | |
| | A3 | | | | | | | | | | | | |

TABLE 3-continued

|  |  | Example | | | | | | | | | | | |
|---|---|---|---|---|---|---|---|---|---|---|---|---|
|  |  | 1 | 2 | 3 | 4 | 5 | 6 | 7 | 8 | 9 | 10 | 11 | 12 |
| Polycarbonate copolymer (B) | B11 | 0.4 |  |  |  |  |  | 0.4 | 0.4 | 0.4 | 0.4 | 0.4 | 0.4 |
|  | B12 |  | 0.4 | 0.7 |  |  |  |  |  |  |  |  |  |
|  | B13 |  |  |  | 0.3 | 0.6 |  | 0.6 |  |  |  |  |  |
|  | B14 |  |  |  |  |  | 0.4 |  |  |  |  |  |  |
| Polytetramethylene glycol | X1 |  |  |  |  |  |  |  |  |  |  |  |  |
|  | X2 |  |  |  |  |  |  | 0.1 |  |  |  |  |  |
| Phosphorus-containing stabilizer (C) | C1 | 0.03 | 0.03 | 0.02 | 0.03 | 0.03 | 0.03 | 0.03 | 0.05 |  |  | 0.02 | 0.02 |
|  | C2 |  |  |  |  |  |  |  |  | 0.03 | 0.03 | 0.02 | 0.02 |
|  | C3 |  |  |  |  |  |  |  |  |  |  |  |  |
| Epoxy or oxetane compound (D) | D1 |  |  | 0.03 | 0.1 |  |  |  |  |  | 0.03 | 0.03 |  |
|  | D2 |  |  |  |  |  |  |  |  |  |  |  |  |
| Q value (×10$^{-2}$ cm$^3$/sec) |  | 42 | 42 | 41 | 42 | 40 | 42 | 43 | 41 | 42 | 42 | 42 | 42 |
| YI (300 mm) |  | 16 | 16 | 16 | 17 | 16 | 17 | 16 | 16 | 17.0 | 17 | 17 | 16 |
| Notched Charpy impact strength (kJ/m$^2$) |  | 35 | 30 | 28 | 38 | 29 | 32 | 28 | 33 | 34 | 30 | 30 | 29 |
| Gas generation at time of molding (Evaluation of mold contamination) |  | A | A | A | A | A | A | B | A | A | A | A | A |

TABLE 4

|  |  | Example | | | | | | | Comparative Example | | |
|---|---|---|---|---|---|---|---|---|---|---|---|
|  |  | 13 | 14 | 15 | 16 | 17 | 18 | 19 | 1 | 2 | 3 |
| Polycarbonate resin (A) | A1 | 100 | 100 | 100 | 100 | 100 | 100 | 100 | 95 | 100 | 100 |
|  | A2 |  |  |  |  |  |  |  |  |  |  |
|  | A3 |  |  |  |  |  |  |  | 5 |  |  |
| Polycarbonate copolymer (B) | B11 | 0.4 | 0.4 | 0.4 | 0.4 | 0.4 | 0.4 | 0.4 |  |  |  |
|  | B12 |  |  |  |  |  |  |  |  |  |  |
|  | B13 |  |  |  |  |  |  |  |  |  |  |
|  | B14 |  |  |  |  |  |  |  |  |  |  |
| Polytetramethylene glycol | X1 |  |  |  |  |  |  |  |  | 0.4 |  |
|  | X2 |  |  |  |  |  |  |  |  |  | 0.4 |
| Phosphorus-containin stabilizer (C) | C1 |  |  | 0.02 |  |  | 0.02 | 0.03 | 0.03 | 0.03 | 0.03 |
|  | C2 |  |  |  | 0.03 |  | 0.02 |  |  |  |  |
|  | C3 | 0.03 | 0.03 |  |  | 0.02 |  |  |  |  |  |
| Epoxy or oxetane compound (D) | D1 |  | 0.03 |  |  |  |  | 0.02 |  |  |  |
|  | D2 |  |  | 0.03 | 0.03 | 0.03 | 0.03 | 0.02 |  |  |  |
| Q value (×10$^{-2}$ cm$^3$/sec) |  | 41.4 | 41.6 | 41.3 | 41.7 | 41.2 | 41.4 | 41.3 | 42 | 42.5 | 44.1 |
| YI (300 mm) |  | 16.0 | 15.8 | 15.7 | 16.6 | 15.8 | 16.3 | 15.8 | 24.9 | 15.8 | 15.2 |
| Notched Charpy impact strength (kJ/m$^2$) |  | 35 | 31 | 27 | 29 | 28 | 28 | 28 | 32 | 15 | 12 |
| Gas generation at time of molding (Evaluation of mold contamination) |  | A | A | A | A | A | A | A | A | C | D |

INDUSTRIAL APPLICABILITY

The polycarbonate resin composition of the present invention exhibits excellent impact resistance, has a good hue and causes very little gas generation and mold contamination at the time of molding, and can therefore be used extremely advantageously in a variety of molded articles, and especially optical components.

The invention claimed is:

1. A polycarbonate resin composition, comprising:
   0.1 to 0.7 parts by mass of a polycarbonate copolymer (B) having carbonate bonding between a (B1) bisphenol A and a (B2) polyalkylene glycol, and
   0.005 to 0.5 parts by mass of a phosphorus-containing stabilizer (C), each relative to 100 parts by mass of the polycarbonate resin,
wherein the polycarbonate copolymer (B) has a weight average molecular weight (Mw) of 5,000 to 40,000.

2. The polycarbonate resin composition of claim 1, wherein the (B2) polyalkylene glycol has a weight average molecular weight (Mw) of 600 to 8,000.

3. The polycarbonate resin composition of claim 1, wherein a proportion of the (B1) bisphenol A is from 5 mass % to less than 50 mass %, and a proportion of the (B2) polyalkylene glycol is more than 50 mass % to 95 mass %, based on a total of 100 mass % of the (B1) bisphenol A and the (B2) polyalkylene glycol.

4. The polycarbonate resin composition of claim 1, wherein the (B2) polyalkylene glycol comprises tetramethylene ether units, trimethylene ether units, or a combination thereof.

5. The polycarbonate resin composition of claim 1, further comprising an epoxy compound (D), an oxetane compound (E) or a combination thereof, at a total amount of 0.0005 to 0.2 parts by mass relative to 100 parts by mass of the polycarbonate resin.

6. A molded article comprising the polycarbonate resin composition of claim 1.

7. The molded article of claim 6, which is an optical component.

* * * * *